April 18, 1950  L. T. SACHTLEBEN  2,504,590
SOUND RECORDING, MONITORING SYSTEM
Filed April 18, 1947  2 Sheets—Sheet 1

Inventor
LAWRENCE T. SACHTLEBEN
Attorney

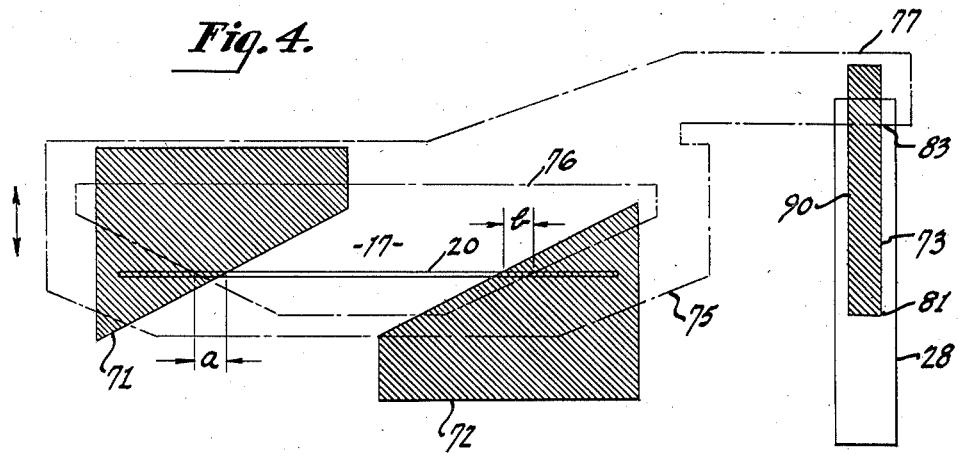
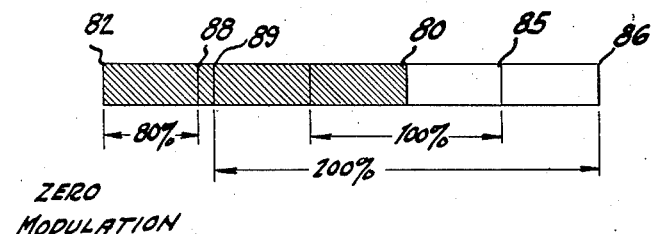
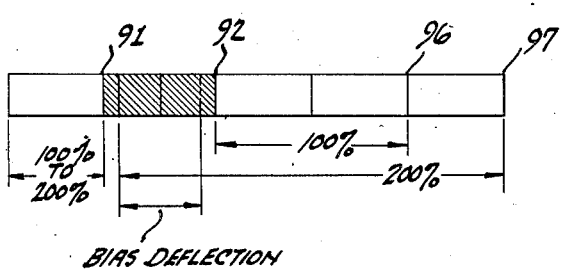

Patented Apr. 18, 1950

2,504,590

UNITED STATES PATENT OFFICE 2,504,590

SOUND RECORDING, MONITORING SYSTEM

Lawrence T. Sachtleben, Haddonfield, N. J., assignor to Radio Corporation of America, a corporation of Delaware Application April 18, 1947, Serial No. 742,360

13 Claims. (Cl. 179—100.3)

This invention relates to sound recording equipment and particularly to the optics of a monitoring system for a sound on film recorder.

Monitoring systems for sound on film recorders whereby the amplitude of vibrations of the modulating element and the excursion of a noise reduction element are visibly indicated are well known. Also, monitoring systems for visually indicating the condition and position of the recording light source have been used. For instance, monitoring systems of this general type are shown in my U. S. Patent No. 2,423,256 of July 1, 1947, and in copending Dimmick application Ser. No. 629,295, filed November 17, 1945, now U. S. Patent No. 2,468,048, granted April 26, 1949. Although these prior systems provide indications of the adjustment of the modulating and noise reduction elements, the present invention has several advantages over the prior arrangements.

In the present system the monitoring images are projected upon the rear of a translucent screen and viewed from the front of the screen. The images are formed by light projected normal to the screen while the screen is tilted substantially 30° from the vertical. This feature of the monitoring system permits an observer of average height to view the images in line with the projection thereof which provides maximum brightness of the images when the screen surface is only partially diffusing, such as, for example, the surface of finely ground glass. Another feature of the monitoring system is that it permits the light source monitoring optics to be made integral with the lamp socket and at lamp filament height without producing keystone effects in the screen image. This permits maximum protection for the monitoring optics and provides a good general appearance of the whole optical system.

The monitoring optics for indicating modulation are all substantially in a vertical plane which permits their being mounted as an integral subassembly instead of isolated elements which may get out of alignment with respect to each other. The present invention is directed to the optics of the monitoring system, the mechanical arrangement of the various groups of elements being disclosed and claimed in my copending application Ser. No. 743,620, filed April 24, 1947.

The principal object of the invention, therefore, is to facilitate the monitoring of a sound recording system.

Another object of the invention is to provide an improved method of and system for visually indicating the action of a sound recording modulating element.

A further object of the invention is to provide an improved optical path for visually indicating the movement of a light beam.

A still further object of the invention is to provide an improved optical system for observing the image of a moving light beam and a stationary light source.

A still further object of the invention is to provide an improved optical path in association with the path of a recording light beam for indicating the modulation of the light beam and the condition of the source providing the light beam.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 4 is a superimposed view of the light beam images, the slit, and a shutter type noise reduction element; and Figs. 5 and 6 show two types of monitoring images received on the monitoring screen.

Figure 1:
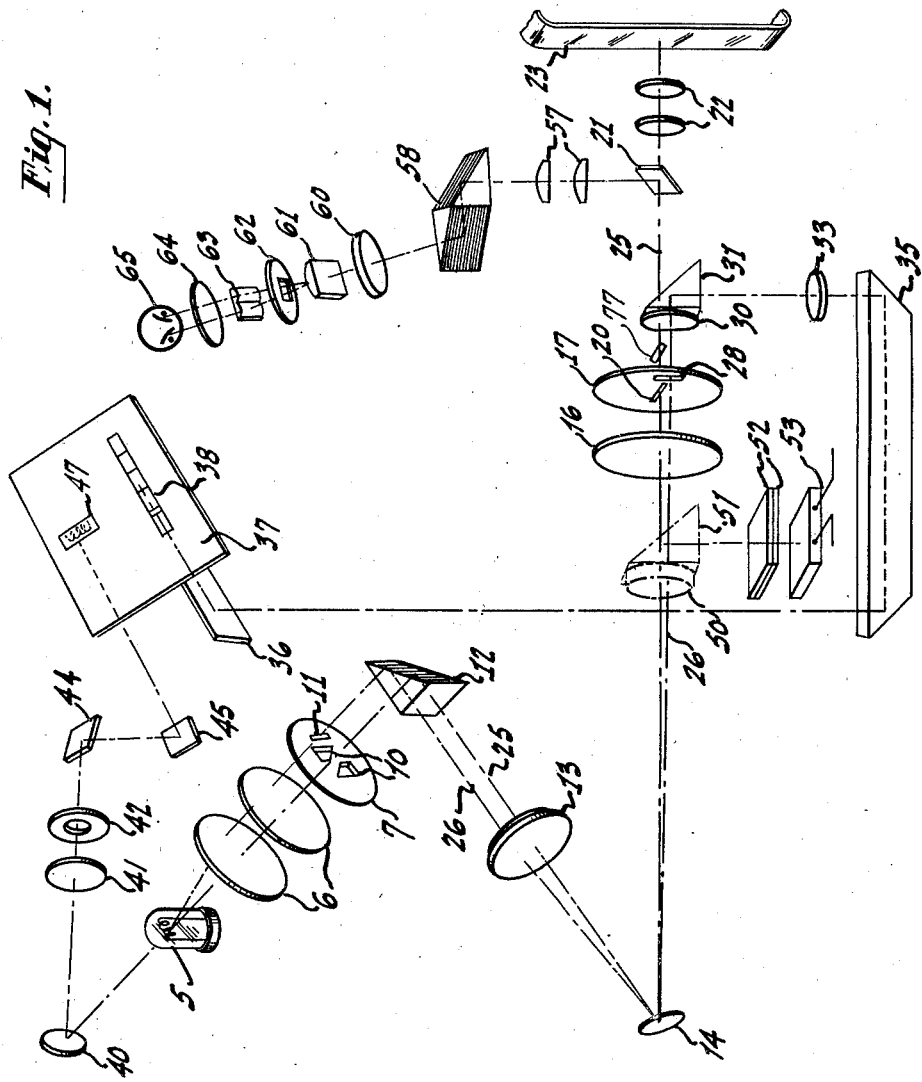
Fig. 1 is a diagrammatic perspective view of the monitoring optical system of the invention shown in association with the recording optical system.
Figures 2, 3:
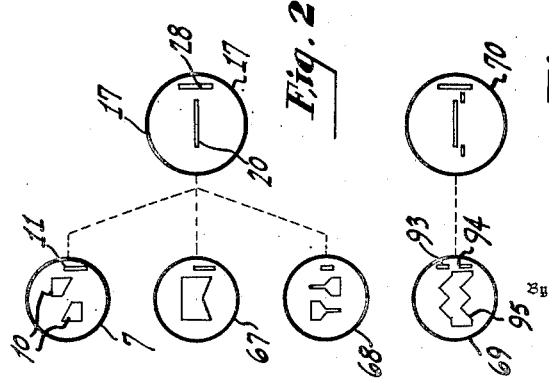
Fig. 2 is a view showing the type of apertures which may be monitored with the invention.
Fig. 3 shows another type of aperture which may be monitored with the present invention.

Referring now to Fig. 1, a light source in the form of a lamp 5 provides light for the recording system. The light from the lamp 5 is collected by lenses 6 and projected to an aperture plate 7, which is of the type shown in the upper section of Fig. 2, and which will produce a class A push-pull type of sound record. This aperture plate is provided with two sound track apertures 10 and a vertical rectangular monitoring aperture 11. Emergent light from the apertures 10 and 11 is reflected at right angles by a prism 12 and then projected by a lens 13 to a mirror 14 of the usual modulating galvanometer. From the mirror 14 the light passes through a slit condenser lens 16 to a slit mask 17, the sound recording light beam passing through a horizontal narrow slit 20, through a dichroic monitoring reflector 21, and an objective lens 22 to a film 23. This general type of sound recording optical system is disclosed and claimed in my copending application Ser. No.

514,225, filed December 14, 1943, now U. S. Patent No. 2,436,671, granted February 24, 1948, one type of monitoring system therefor being disclosed and claimed in my above mentioned copending application.

The sound record light beam has been indicated by the broken line 25 while the monitoring light beam passing through the aperture 11 has been indicated by the broken line 26. The monitoring light beam through the aperture 11 passes through the same optical elements as the recording light beam between the light source 5 and the slit plate 17 at which point it passes through a vertical rectangular monitoring window 28.

The image of the aperture 11 in mask 7 is caused to fall in the plane of the slit plate 17 by the prism 12, lens 13, and lens 16. The light of the recording beam passing to the film 23 forms an image of the mirror 14 in the objective lens 22 through the action of condenser lens 16. The light through the aperture 11, vibrates in accordance with the recording light beam to the film 23 since both are modulated by mirror 14, the monitoring beam, however, being intercepted by a lens 30 which is cemented to a prism 31 positioned behind the window 28. This light, as shown by ray 26, is incident upon lens 30 at a point near its edge which is closest to the main optical axis shown by ray 25. The optical center of lens 30 is somewhat farther removed from the main optical axis 25 so that the lens 30 exhibits a prismatic action rendering the axis or principal ray of the monitoring beam parallel to the main optical axis 25 upon refraction at the first surface of lens 30, so that this ray remains in a vertical plane parallel to the main optical axis 25 until it is reflected to the monitoring screen.

After refraction by lens 30, the monitoring light is reflected downwardly by prism 31 to a spherical lens 33. The curvature of the first surface of lens 30 is such that a stationary image of mirror 14 is formed in lens 33, whose power is such that an image of the plane of window 28 is finally formed on the monitoring screen 37 at a magnification of approximately five times. Lens 33 is adjustable axially for focus.

From lens 33 the monitoring light passes to an isosceles trapezoidal prism 35 which carries the light to the rear toward the mirror 14 and then directs it vertically to a front surfaced plane mirror 36 positioned behind a translucent rear projection screen 37 to which the monitoring light is reflected. The screen 37 is tilted about its lower edge to make an acute angle of about 30° with the vertical such that the light from the mirror 36 strikes the screen 37 perpendicularly to form image 38. This arrangement of the screen 37 permits the image 38 to be viewed coincident with the line of projection of light from the mirror 36. As screen 37 is positioned about 48 inches above the floor when attached to the recorder, the average observer's line of sight will coincide with the line of projection to provide maximum brightness of the image 38. Also, keystoning of the image 38 will be avoided since the projection axis is not tilted with respect to the surface of the screen.

In addition to monitoring the mirror vibrations the condition of the filament of the lamp 5 is also indicated on the screen 37. The optical system for the light source includes a reflector 40 which reflects light in a horizontal plane to a spherical lens 41 behind which is an aperture plate 42. The light is then reflected downwardly by mirror 44 to a mirror 45 which projects the light at an angle of approximately 30° to the horizontal to the screen 37 as shown by image 47. Thus, the beam of light from mirror 45 strikes the screen 37 at right angles and the image 47 suffers no keystone effect and is parallel with the line of light from the mirror 36 to the screen 38. As the image 47 may be viewed coincident with the axis of the light beam producing it, maximum brightness is provided. The magnification of the filament is substantially 3.75 times.

To provide a light meter for the modulating beam, an optical unit comprising a spherical lens 50 and reflecting prism 51 cemented together may be inserted in the beam of light whenever it is desired to read its intensity. The elements 50 and 51 are mounted so they do not normally intercept the beam 25 and are inserted into the beam whenever a reading is desired. They have, therefore, been shown in dotted lines. The intercepted light beam is projected downwardly by prism 51 through a pair of plates 52, one of which may be a filter, to a photo-voltaic cell 53, to which may be connected any suitable type of meter. A meter system of this general type is disclosed and claimed in Collins U. S. Patent No. 2,233,914 of March 4, 1941.

For the purpose of monitoring the signal being recorded, a dichroic reflector 21 positioned in the light beam reflects the red end of the spectrum upwardly through a pair of cylindrical lenses 57 to a double reflecting prism 58. The light from the prism 58 passes through a plane glass plate 60, a cylindrical lens 61, the aperture of a plate 62, a pair of splitting cylindrical lenses 63, plane glass plate 64 to a push-pull photoelectric cell 65. The lenses 57 image the slit on the lenses 63. The cell 65 may be connected to a pair of head-phones or a loudspeaker for monitoring the light variation as impressed on the film 23. A monitoring system of this basic type using a dichroic reflector is disclosed and claimed in Dimmick U. S. Patent No. 2,314,392 of March 23, 1943.

As an illustration of a practical monitoring system for the visual observation of the degree of modulation and the condition of the light source, the distance from the plate 17 to the reflecting surface of the prism 31 was .405 inch, while the distance from the prism 31 to the reflecting surface of the trapezoidal prism was 1.625 inches. The light was reflected rearwardly a distance of 1.812 inches and then upwardly to the reflecting surface of reflector 36 a distance of 2.561 inches. The dimensions of the optical path for the filament image 47 are as follows: The reflector 40 is positioned 1.375 inches from the filament of lamp 5, while the reflector 44 is positioned 2.272 inches from the mirror 40, the lower mirror 45 being .426 inch below mirror 44. The distance of projection from mirror 45 to screen 37 was 7.773 inches. For purposes of comparison, the vertical distance from reflector 21 to prism 58 was 1.688 inches while the distance from reflector 58 to photo-cell 65 was 2.032 inches. In the light meter unit, the distance from the reflecting surface of prism 51 to the light cell 53 was 2.5 inches.

As mentioned above, any of the four masks shown in Figs. 2 and 3 at 7, 67, 68 and 69, may be used in the system of Fig. 1, mask 7 producing a class A push-pull track, mask 67 producing a single duplex track, mask 68 producing a class B push-pull track, and mask 69 producing either a negative or a positive double bilateral track. The slit plate 17 may be used with either of the masks 7, 67 or 68, while the slit plate 70 may be used with the mask 69 as disclosed and claimed in copending Dimmick application Ser. No. 629,-294, filed November 17, 1945, now U. S. Patent No. 2,468,048, granted April 26, 1949. Furthermore, masks 7 and 67 use shutters to obtain noise reduction, class B mask 68 requires no noise reduction and mask 69 uses a biased galvanometer.

Selecting mask 7 to illustrate the monitoring image 38 in the system, reference in made to Figs. 4 and 5 wherein the cross hatched areas 71 and 72 represents the light image from apertures 10 on the slit plate 17 and slit 20. The cross hatched area 73 represents the light image passing aperture 11 of the mask 7 and projected through window 28. The edge of the noise reduction shutter vane is shown by broken lines 75 in which is an opening 76, the vane also having a tab 77 which intercepts light between the window 28 and the lens 30 in accordance with the position of the vane 75. The opening 76 is located close to the slit 20 and between it and the lens 30 where it moves up and down in accordance with the amplitude of the rectified signal currents. Thus, the light reaching the film 23 depends upon the position of the images 71 and 72 with respect to slit 20 and the position of the openings 76 with respect to the slit 20. The images 71 and 72 vibrate normal to the slit 20 in accordance with the instantaneous variations of the signal currents while the opening 76 moves perpendicular to the slit 20 in accordance with the envelope of the signal currents. At time of no signal the respective position of the images 71 and 72 and the opening 76 is as shown on the drawing, there being two narrow bias lines a and b of light passing to the film 23.

The light image 73 will be projected through the above described system to the screen 37 and will appear as a horizontal rectangle of light shown in Fig. 5 by the cross hatched portion. That is, the point 80 corresponds to the end 81 of the beam 73 while the point 82 corresponds to the point 83 where the tab 77 intercepts the beam 73. Now, when the images 71 and 72 are modulated, that is, vibrated normal to the slit, the end 80 will likewise vibrate and spread until the end 80 appears at point 85 at 100 percent modulation which is the time when the sloping sides of the beams 71 and 72 reach the ends of the slit 20. Should the beam be 200 percent over modulated the end of the beam will then extend to the point 86.

As the amplitude of the signal increases the opening 76 is moved downwardly which moves the tab 77 downwardly, thus, shortening the left hand end of the beam as seen in Fig. 5. The system is adjusted so that the sloping edges of the opening 76 will contact the ends of the slit 20 when the amplitude of the signal is 80 percent of full modulation and this corresponds to a shortening of the left hand end of the beam to a point such as shown at 88. Further downward movement of opening 76 will not uncover any more of the slit 20 but may be indicated by further shortening of the beam to point 89. The point 88 may be represented by point 90 on the image 73. Thus, the position and the amplitude of vibration of the modulating light beam will always be shown by the horizontal image 38, and, because of the optical path and the position of the image, it will have maximum brightness.

As mentioned above the aperture 69 uses the biased galvanometer. That is, instead of the rectified signal currents being employed on the shutter 76, it is impressed on a second winding of the galvanometer and varies the average position of the mirror 14. When this system is used the image at 38 appears, as shown on the shaded portion of Fig. 6, between points 91 and 92, this image being formed by light passing through either aperture 93, or 94, according to whether the upper or lower edge of the aperture is being employed. If apertures 93 and 94 are off-set horizontally their images will appear off-set vertically as disclosed and claimed in the above mentioned co-pending Dimmick application. To indicate the amplitude of modulation this shaded area vibrates according to the amplitude of the signal and end 92 will move to point 96 for 100 percent modulation and to point 97 for 200 percent modulation. The amount of noise reduction is indicated by the position of the image 91—92. During modulation the beam 91—92 moves to the right and vibrates about mean positions to the right, the amount of this displacement of the means position being indicated by the distance marked bias deflection.

I claim:

1. A sound recording monitoring system comprising a light source, and an aperture plate illuminated by said light source and having a sound recording aperture and an adjacent, vertically elongated, rectangular monitoring aperture therein, means for vibrating in a vertical plane the light passing through the recording aperture and through said monitoring aperture, a slit plate having therein a recording slit and a vertically elongated, rectangular monitoring window through which the monitoring light passes, a first optical element for downwardly reflecting said monitoring light passing through said window, a light beam modulator between said monitoring window and said first optical element, a second optical element for directing said monitoring light from said first optical element parallel to the path of said light from said vibrating means to said slit plate in said vertical plane, said second optical element also directing said light upwardly in said plane, an observation medium, and means for deflecting said vertically directed light perpendicular to said observation medium.

2. A sound recording monitoring system in accordance with claim 1, in which optical means are provided for reflecting light directly from said light source in a horizontal plane, in a downward direction, and perpendicular to said observation medium.

3. A sound recording optical system comprising a light source, an aperture plate having a recording aperture and an adjacent elongated monitoring aperture therein, a slit plate in a substantially vertical plane having a horizontally elongated, rectangular recording slit therein, and a vertically elongated, rectangular monitoring window, means between said aperture plate and said slit mask for vibrating the light passing through said recording aperture across said slit, and the light passing through said monitoring aperture passing through said window in a substantially vertical plane, an observation medium tilted at an angle to a vertical plane, a light modulator for light passing through said window, and optical means for deflecting said vibrating light passing through said monitoring window and modulated by said modulator in a vertical plane to the rear of said observation medium, and means for reflecting said light perpendicular to said observation medium.

4. A sound recording optical system in accordance with claim 3 in which optical means are provided for projecting light directly from said light source and perpendicularly to said observation medium.

5. A sound recording optical system in accordance with claim 4 in which said first mentioned optical means comprises a downwardly reflecting prism having a lens attached to the light incident face thereof, a trapezoidal reflecting prism to deflect the monitoring light parallel to itself, and a front surface reflecting element.

6. A sound recording optical system in accordance with claim 3 in which a reflecting element, a lens and a pair of reflecting elements are arranged in series between said light source and said observation medium to project light from said source perpendicularly to said observation medium.

7. A sound recording optical system comprising a light source, an aperture plate having a light passing recording aperture and a vertically elongated, rectangular light passing monitoring aperture, therein, a slit plate having a horizontally elongated, rectangular light passing recording slit and a vertically elongated, rectangular light passing monitoring window, a screen mounted above said slit plate and tilted at an angle to the vertical, and an optical system adapted to deflect a light image of said monitoring aperture in a plurality of directions in a vertical plane, to magnify said light image and to project said image perpendicularly to the rear surface of said screen.

8. A sound recording optical system in accordance with claim 7 in which an element is provided behind and adjacent said window for varying the length of the image of said monitoring aperture in accordance with the average amplitude variation of the signal being recorded.

9. A sound recording optical system in accordance with claim 8 in which optical means are provided for reflecting light from said light source detected in the same plane in which the light is projected through said recording and monitoring apertures of said aperture plate, said optical means projecting an image of said light source perpendicularly to the rear surface of said screen.

10. A sound recording optical system in accordance with claim 9 in which means are provided for intercepting a portion of the light passing said recording slit for detecting the variations in the light passing said slit.

11. A sound recording monitoring system comprising a light source, an aperture plate having an aperture for passing a recording light beam and a vertically elongated, rectangular aperture for passing a monitoring light beam, said beams being in a substantial horizontal plane, a slit plate having a horizontally elongated, rectangular slit therein to pass portions of said recording light beam depending upon the instantaneous values of a signal being recorded and a vertically elongated, rectangular window therein to pass said monitoring light beam, one end of said beam varying in accordance with the instantaneous values of said signal, a screen above said slit plate and tilted at an angle to a vertical plane, optical means for projecting an image of said monitoring aperture in a vertical plane and perpendicular to said screen, and means adjacent said slit plate for varying the other end of said monitoring beam in accordance with the variations in amplitude of said signal.

12. A sound recording system in accordance with claim 11 in which optical means are provided for projecting an image of said light source normal to said screen, said means including a magnifying lens and a plurality of reflectors for detecting light rays from said source in a plane coincident with the light rays through said apertures.

13. A sound recording system in accordance with claim 11 in which means are provided for determining the intensity of said recording light beam.

LAWRENCE T. SACHTLEBEN.

REFERENCES CITED

The following references are of record in the file of this patent:

UNITED STATES PATENTS

| Number | Name | Date |
|---|---|---|
| 2,166,185 | Stack | July 18, 1939 |
| 2,166,186 | Stack | July 18, 1939 |
| 2,220,198 | Batsel | Nov. 5, 1940 |
| 2,270,350 | Schomacker | Jan. 20, 1942 |
| 2,289,054 | Dimmick | July 7, 1942 |
| 2,318,138 | Benfer | May 4, 1943 |